United States Patent
Mansour et al.

(10) Patent No.: US 11,200,438 B2
(45) Date of Patent: Dec. 14, 2021

(54) SEQUENTIAL TRAINING METHOD FOR HETEROGENEOUS CONVOLUTIONAL NEURAL NETWORK

(71) Applicant: Dura Operating, LLC, Auburn Hills, MI (US)

(72) Inventors: Iyad Faisal Ghazi Mansour, Auburn Hills, MI (US); Heinz Bodo Seifert, Ortonville, MI (US)

(73) Assignee: DUS Operating Inc., Auburn Hills, MI (US)

(*) Notice: Subject to any disclaimer, the term of this patent is extended or adjusted under 35 U.S.C. 154(b) by 190 days.

(21) Appl. No.: 16/707,264

(22) Filed: Dec. 9, 2019

(65) Prior Publication Data

US 2020/0184244 A1    Jun. 11, 2020

Related U.S. Application Data

(60) Provisional application No. 62/776,823, filed on Dec. 7, 2018.

(51) Int. Cl.
*G06K 9/00* (2006.01)
*G06K 9/62* (2006.01)
(Continued)

(52) U.S. Cl.
CPC ....... *G06K 9/00993* (2013.01); *G06K 9/6256* (2013.01); *G06N 3/0454* (2013.01); *G06N 3/08* (2013.01)

(58) Field of Classification Search
CPC .... G06K 9/6256; G06K 9/628; G06K 9/6262; G06K 9/6267; G06K 9/6227; G06K 9/00369; G06K 9/00744; G06K 2209/05; G06K 9/00147; G06K 9/00463; G06K 9/00718; G06K 9/00805; G06K 9/3233; G06K 9/4628; G06K 9/627; G06K 7/1413;
(Continued)

(56) References Cited

U.S. PATENT DOCUMENTS 6,400,835 B1    6/2002    Lemelson
6,529,809 B1    3/2003    Breed
(Continued)

OTHER PUBLICATIONS

Zhu, Yingying et al., Cascaded Segmentation-Detection Networks for Text-Based Traffic Sign Detection, EEE Transactions on Intelligent Transportation Systems, Jan. 2018, 209-219, vol. 19.
(Continued)

*Primary Examiner* — Ajibola A Akinyemi
(74) *Attorney, Agent, or Firm* — Vivacqua Crane, PLLC

(57) ABSTRACT

A method of training a heterogeneous convolutional neural network (HCNN) system includes identifying batch sizes for a first task and a second task, defining images for a first batch, a second batch, and a batch x for the first task, defining images for a first batch, a second batch, and a batch y for the second task, training the HCNN using the first batch for the first task, training the HCNN using the first batch for the second task, training the HCNN using the second batch for the first task, training the HCNN using the second batch for the second task. The sequential training continues for each of the batches and each of the tasks until the end of an epoch. When the epoch is complete, the images for each batch and each task are reshuffled.

16 Claims, 4 Drawing Sheets

(51) Int. Cl.
*G06N 3/04* (2006.01)
*G06N 3/08* (2006.01)

(58) Field of Classification Search
CPC ............ G06K 9/0014; G06K 9/00208; G06K 9/00281; G06K 9/00288
USPC .......................................................... 382/156
See application file for complete search history.

(56) References Cited

U.S. PATENT DOCUMENTS

| | | | |
|---|---|---|---|
| 9,483,695 B2 | 11/2016 | S. | |
| 9,940,573 B2* | 4/2018 | Young | G06N 3/0481 |
| 10,289,938 B1 | 5/2019 | Flowers et al. | |
| 10,322,728 B1 | 6/2019 | Porikli et al. | |
| 10,346,969 B1* | 7/2019 | Raghu | G06T 7/0004 |
| 10,684,626 B1 | 6/2020 | Martin | |
| 10,850,693 B1 | 12/2020 | Pertsel et al. | |
| 2008/0069403 A1 | 3/2008 | Breed | |
| 2008/0292146 A1 | 11/2008 | Breed et al. | |
| 2014/0200737 A1 | 7/2014 | Lortz et al. | |
| 2014/0310594 A1 | 10/2014 | Ricci | |
| 2015/0009010 A1 | 1/2015 | Biemer | |
| 2017/0076195 A1 | 3/2017 | Yang et al. | |
| 2017/0228645 A1* | 8/2017 | Wang | G06N 3/0454 |
| 2017/0336793 A1 | 11/2017 | Shashua et al. | |
| 2018/0012092 A1 | 1/2018 | Gleeson-May | |
| 2018/0025243 A1 | 1/2018 | Chandraker | |
| 2018/0053103 A1 | 2/2018 | Delgado | |
| 2018/0060648 A1 | 3/2018 | Yoo | |
| 2018/0157972 A1 | 6/2018 | Hu | |
| 2018/0189581 A1 | 7/2018 | Turcot et al. | |
| 2018/0330178 A1 | 11/2018 | el Kaliouby et al. | |
| 2019/0019068 A1 | 1/2019 | Zhu | |
| 2019/0114774 A1 | 4/2019 | Zhang | |
| 2019/0143989 A1 | 5/2019 | Oba | |
| 2019/0213429 A1 | 7/2019 | Sicconi | |
| 2019/0279009 A1 | 9/2019 | Srirangam Narashiman | |
| 2019/0311202 A1 | 10/2019 | Lee | |
| 2019/0370580 A1 | 12/2019 | Aoi | |
| 2020/0026996 A1 | 1/2020 | Kolter et al. | |
| 2020/0228336 A1 | 7/2020 | Streit | |
| 2020/0234124 A1 | 7/2020 | Park | |
| 2020/0309930 A1 | 10/2020 | Zhou | |
| 2020/0334477 A1 | 10/2020 | Aoi | |
| 2020/0364508 A1 | 11/2020 | Gurel | |
| 2021/0158023 A1* | 5/2021 | Fu | G06T 7/70 |

OTHER PUBLICATIONS

Mansour, Iyad et al., A Proposed Heterogeneous Convolutional Neural Network for Embedded Automotive Vision Algorithms. May 2018.
Jiang, Fan et al., Deep Scene Text Detection with Connected Component Proposals, AMAP Vision Lab, Aug. 2018, 1-10.
Zhu, Yixing and Du, Jun, Sliding Line Point Regression for Shape Robust Scene Text Detection, Jan. 30, 2018.

* cited by examiner

FIG. 1

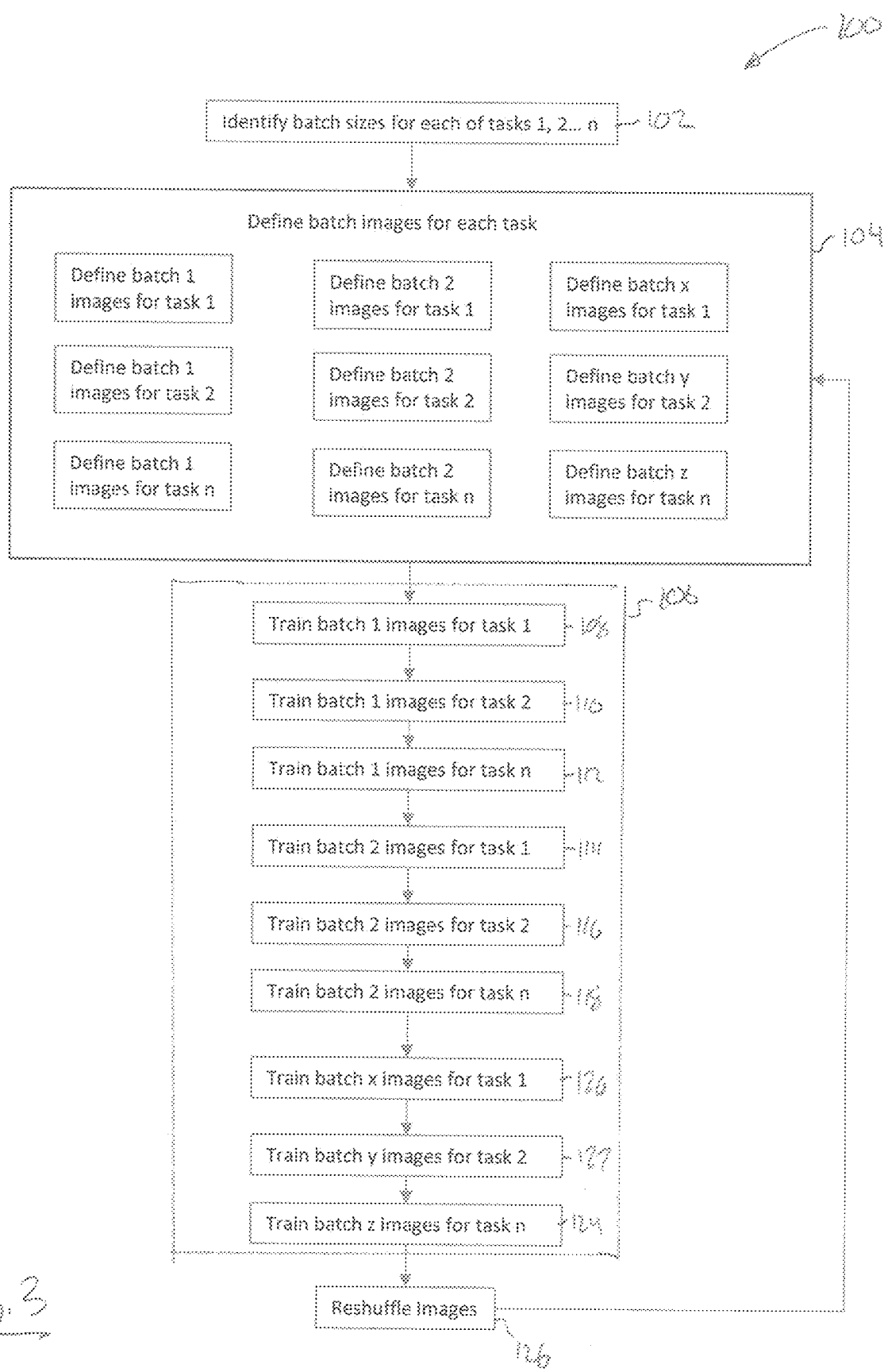

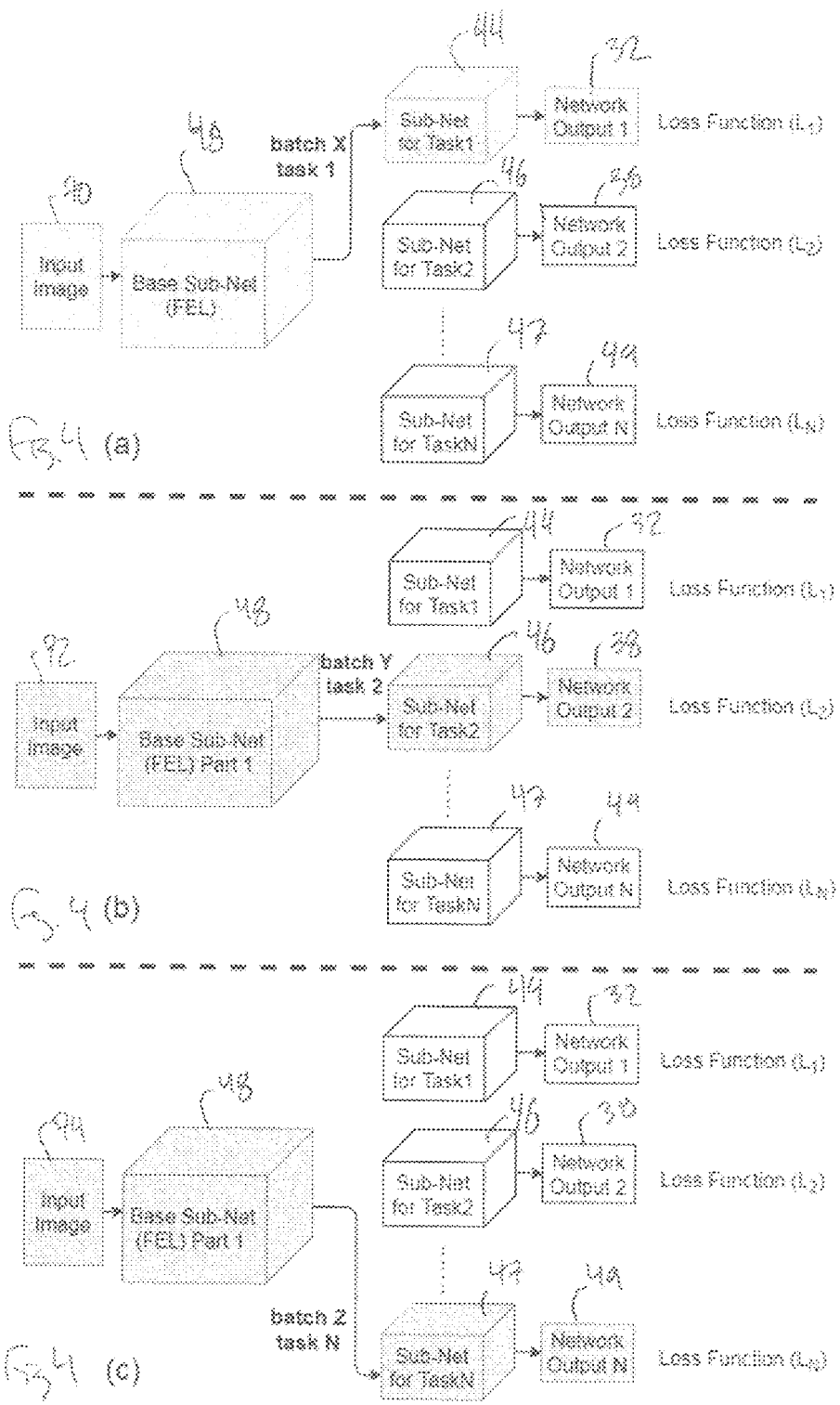

SEQUENTIAL TRAINING METHOD FOR HETEROGENEOUS CONVOLUTIONAL NEURAL NETWORK

FIELD

The present disclosure relates generally to artificial intelligence convolutional neural networks, and more particularly to a sequential training method for a heterogeneous convolutional neural networks (HCNN).

BACKGROUND

The statements in this section merely provide background information related to the present disclosure and may or may not constitute prior art.

Convolutional neural networks (CNNs) are being used to solve problems in computer vision, including image classification, object detection, and object segmentation problems. A CNN may be comprised of one or more convolutional layers, typically including a subsampling step, followed by one or more fully connected layers similar to a standard multilayer neural network. The architecture of a CNN is designed to take advantage of the 2D structure of an input image including pixel images from a camera. This includes local connections and tied weights followed by some form of pooling which produce translation invariant features. The benefits of CNNs include they are easy to train and have fewer parameters than fully connected networks with the same number of hidden units.

Conventional CNNs do not solve two or more independent problems at the same time. For example, known CNNs when applied to automobile vehicle assist and autonomous control systems cannot perform object detection including classification and localization, and road segmentation (lane detection) problems simultaneously. This requires the vehicle computer system to perform multiple parallel or independent computational steps, thereby requiring longer computational time and increased memory.

A Heterogenous Convolutional Neural Network (HCNN), described in commonly owned U.S. patent application Ser. No. 16/293,180, filed Mar. 5, 2019, herein incorporated by reference, addresses these issues. A HCNN is a CNN that utilizes common low-level feature extraction layers to extract features for more than one CNN network (e.g. object detection and free space classification, lane detection, and drivable surface determination, etc.) concurrently. However, the HCNN is more difficult to train than the CNN. A CNN typically uses annotated image training sets that identify the content of the image that the CNN is supposed to detect and identify. If the CNN is trained to detect and classify objects (e.g. a passenger car) the CNN will require a large number of images where all objects (passenger cars) are identified in a way that the CNN can detect. The CNN then uses 'back-propagation' techniques to minimize the loss function that defines how well the object of interest is detected by adjusting the weights of the connections between neurons in individual layers.

The available set of annotated images (n) is usually very large and will contain a large variety of objects that are presented to the CNN for training purposes. The task of presenting the CNN the complete image data is referred to as an 'epoch'. Images are usually not trained in one operation but instead are broken up in 'b' 'batches' with b=n/bs with 'bs' being the batch size. A batch describes the process of presenting the CNN with the image (forward pass) and then adjusting the weights (backward pass). After all batches have been processed the epoch is complete and then the images are shuffled, new batches are created, and another epoch begins.

However, the HCNN requires image sets annotated for all specified machine vision tasks, for example object detection and free space classification, lane detection, and drivable surface determination, etc., thus complicating the training. One option is to train the HCNN in one specified machine vision task first and then to proceed with the other. In this method, the common feature extraction layer first receives training for the first machine vision task and then during the training of the next task the weights that were optimized for the previous task will be solely optimized for the second task and some of the fidelity for the previous task will be lost. Thus, while useful, there remains a need in the art for a method to train an HCNN that improves the accuracy of the HCNN.

SUMMARY

A method of training a heterogeneous convolutional neural network (HCNN) system includes identifying batch sizes for a first task and a second task, defining images for a first batch and a second batch for the first task, defining images for a first batch and a second batch for the second task, training the HCNN using the first batch for the first task, training the HCNN using the first batch for the second task, training the HCNN using the second batch for the first task, training the HCNN using the second batch for the second task, and reshuffling the images for each batch.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a pictorial diagram of a roadway visibility and identification range of a host vehicle having a heterogeneous convolutional neural network (HCNN) system of the present disclosure;

FIG. 3 is a flow chart illustrating a method for training the HCNN system according to the present disclosure;

Figure 2:
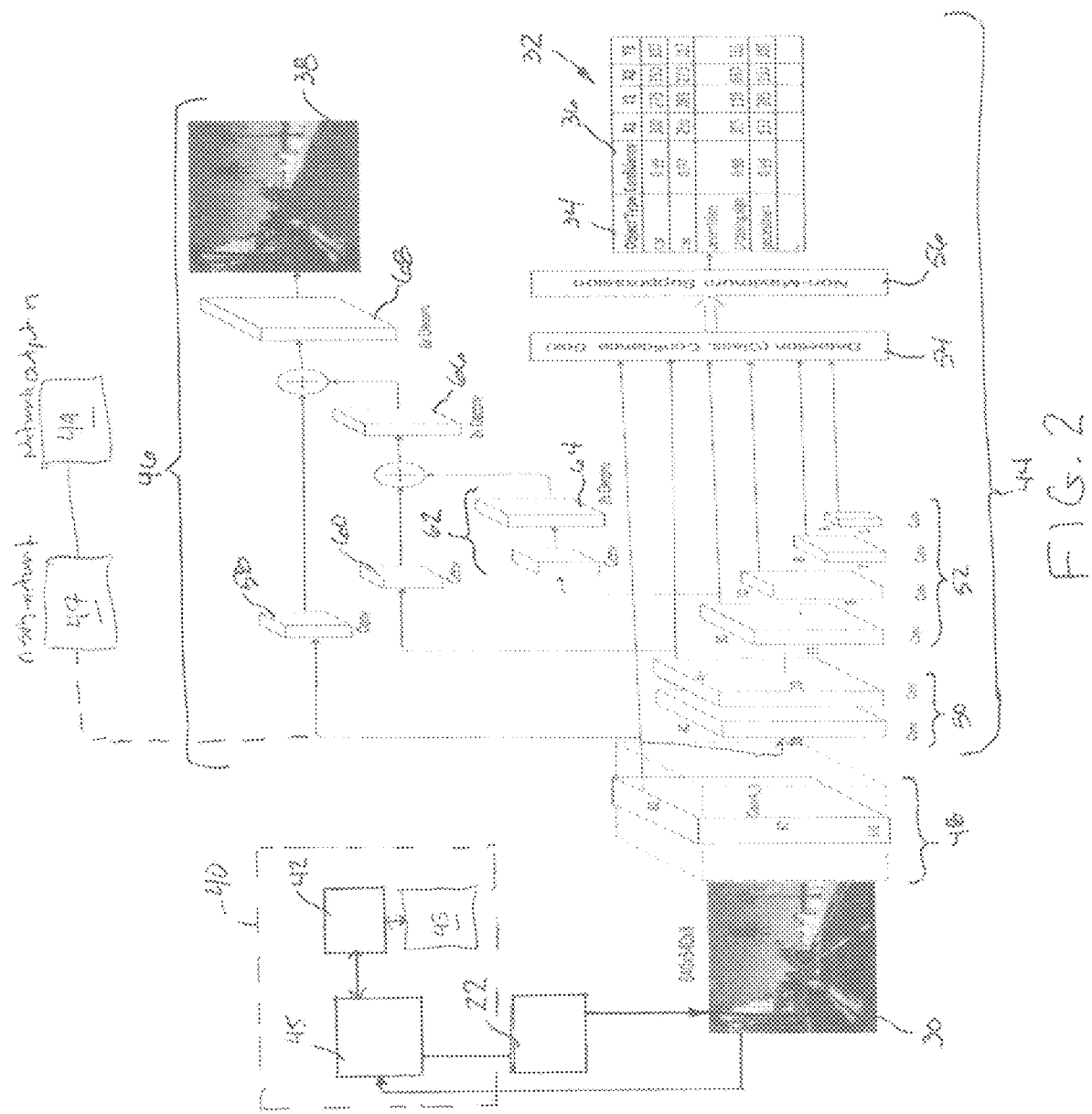
FIG. 2 is a diagrammatic presentation of the elements of the HCNN system of the present disclosure.

FIG. 4$a$ is a flow diagram describing a first step in a multi-step training process to freeze part of the network and minimize a loss function $L_1$ for training the CNN system of FIG. 2;

FIG. 4$b$ is a flow diagram describing a second step in a multi-step training process to freeze part of the network and minimize a loss function $L_2$ for training the CNN system of FIG. 2; and FIG. 4$c$ is a flow diagram describing a third step in a multi-step training process to freeze part of the network and minimize a loss function $L_n$ for training the CNN system of FIG. 2.

DETAILED DESCRIPTION

The following description is merely exemplary in nature and is not intended to limit the present disclosure, application, or uses.

Figure 1:
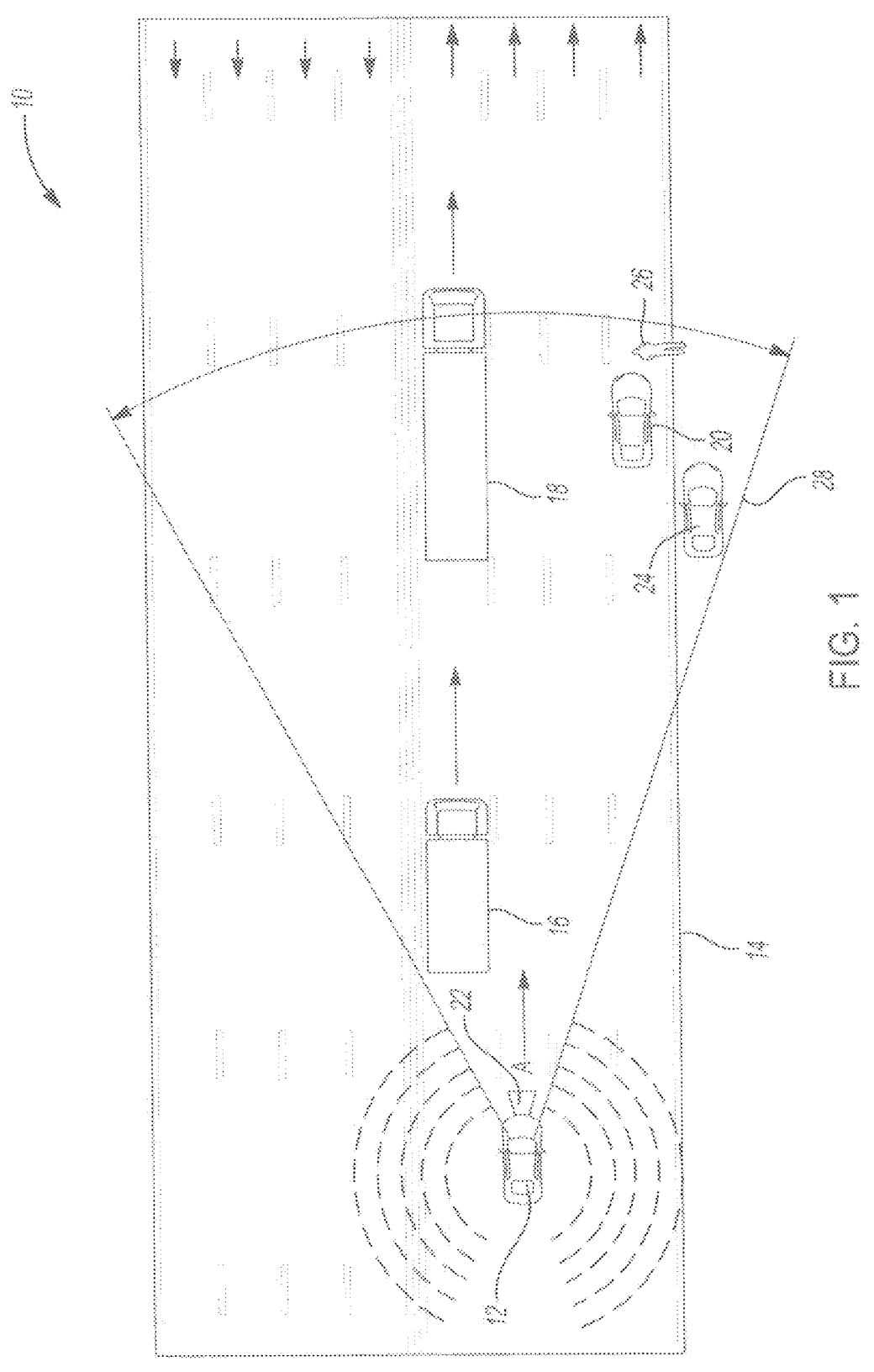

Referring to FIG. 1, a heterogeneous convolutional neural network (HCNN) system 10 receives object attribute data in a host vehicle 12 as it travels on a road or highway 14 in a general path of travel "A" in a third lane of the highway 14 together with other vehicles on the highway 14. The other vehicles can include for example a first vehicle 16 such as a truck in an adjacent second lane but in front of the host vehicle 12, a second vehicle 18 which may be partially blocked from direct view to the host vehicle 12 by the first vehicle 16, as well as a third vehicle 20 such as a car travelling in a third lane on the highway 14. Object attribute data may also be received from a fourth vehicle 24 which is stopped or disabled and may be on the highway 14 or off to a side of the highway 14. The image received by the system may also include a pedestrian 26. It should be appreciated that various other objects may be detected by the host vehicle 12.

The HCNN system 10 receives image data via a visual reception system 22 such as a camera, a LIDAR, or a RADAR system which collects the object attribute data, for example as a pixel image 30 shown and described in reference to FIG. 2. In this manner the object attribute data may be utilized for Advanced Driver Assist (ADAS) technology by also utilizing sensors that are in an existing centralized vision processor. The visual reception system 22 may further receive information as object imaging data defining the pedestrian 26 in an immediate vicinity of the fourth vehicle 24, and fixed objects such as bridges, guard rails, trees, highway signs, and the like that are all located within a host vehicle predefined sensing and transmission window 28 of the HCNN system 10.

Referring to FIG. 2 and again to FIG. 1, the heterogeneous convolutional neural network (HCNN) system 10 of the present disclosure receives an input image 30 generated by the visual reception system 22. The HCNN system 10 may further receive additional input images over a predetermined period of time, for example once every 30 ms as the host vehicle 12 travels along the highway 14. It is desirable to generate at least two network outputs using the data in the input image 30, by solving at least two independent problems. A first network output defining a detected object table 32 provides a list of detected objects, including object types 34 such as a car, a truck, a pedestrian, and the like, and a confidence level 36 in the accuracy of defining the object type 34. Production of the detected object table 32 requires solutions of classification and localization of the objects. A second network output defining a segmentation data set 38 provides data to the host vehicle 12 related to lane detection, lane conditions, and lane positions relative to the host vehicle 12 within the transmission window 28 of the HCNN system 10.

The HCNN system 10 includes a controller 40 which controls the visual reception system 22 and processes the data in the input image 30. The controller 40 is a non-generalized, electronic control device having a preprogrammed digital computer or processor 42, memory or non-transitory computer readable medium 43 used to store data such as control logic, software applications, instructions, computer code, data, lookup tables, etc., and input/output ports 45. The computer readable medium 43 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The processor 42 is configured to execute the code or instructions.

As noted above the HCNN system 10 performs several parallel tasks. A first sub-network 44 performs a first task of object detection, classification, and localization for certain classes of objects (vehicles, pedestrians, traffic signs, traffic lights, and the like,) where the output from the first sub-network 44 is the list of detected objects, detected object table 32, which provides a confidence level and location information for the detected objects. A second sub-network 46 performs a second task of lane detection. A pixel level segmentation is the solution and the output for the second sub-network 46 providing a colored image defining the segmentation data set 38 that indicates the drivable roads or lanes in front of the host vehicle 12. Additional third and more sub-networks, up to an n sub-network 47 outputting a network output n 49, where n is a whole number greater than 1, performing further tasks may also be provided with the HCNN system 10.

The HCNN system 10 includes convolutional neural networks (CNNs) having multiple convolution, pooling and activation layers stacked together with each other. A first set of these layers defines a feature extraction layer (FEL) portion 48 defining the first set of layers directly after and directly receiving the input image 30. The FEL portion 48 conducts a learning operation and thereby learns to represent a first stage of data of the input image 30. The FEL portion 48 includes multiple different stacked layers, wherein the first set of layers (the one directly after and receiving the input image 30) learns to represent data in a very simple form such as horizontal and vertical lines and simple blobs of colors. The following layers of the FEL portion 48 capture more complex shapes such as circles, rectangles, triangles, and the like. The subsequent layers of the FEL portion 48 detect complex combinations of features from the previous layer or layers to form a more meaningful representation such as wheels, faces, grids, and the like. The FEL portion 48 distributes the first stage of data to each of the first sub-network 44 and the second sub-network 46 and the n sub-network 47.

In the first sub-network 44, included with the layers defining the FEL portion 48 is a sub-set of convolution, pooling and activation layers stacked on top of each other defining a first convolution and pooling layer (CPL) portion 50 and a second convolution and pooling layer (CPL) portion 52. The first convolution and pooling layer (CPL) portion 50 receives the first stage of data output from the FEL portion 48 and in a second stage of data captures the more complex shapes more complex shapes including circles, rectangles, triangles, and the like to handle the individual special tasks including object detection, classification, and localization. The third and final grouping of layers defining the second convolution and pooling layer (CPL) portion 52 of the first sub-network 44 then captures a third stage of data defining complex combinations of the features from the FEL portion 48 and the first CPL portion 50 to form a meaningful representation such as wheels, faces, grids, and the like needed to handle the individual special tasks such as object detection, classification, and localization.

Data from each of the FEL portion 48, including the CPL portion 50 and the CPL portion 52 are merged to generate a fully connected layer 54. Non-maximum suppression of the data of the fully connected layer 54 is used to generate output image 56 data having predicted objects identified at specific x, y coordinate locations in the field of the original input image 30, from which the detected object table 32 is generated.

The HCNN system 10 combines different sub-networks such as the first sub-network 44 and the second sub-network 46 to perform multiple tasks efficiently, thereby using a smaller memory footprint (memory saving) and operating faster than running the different sub-networks separately. To accomplish this, the single FEL portion 48 and therefore the tasks performed by the single FEL portion 48 are common to all the CNNs of the first sub-network 44 and the second sub-network 46 (and any additional sub-networks) for HCNN system 10 regardless of the final task performed by each individual CNN. Because the initial volume of data analyzed from the input image 30 is greatest, by performing this analysis only once and using the output of the single FEL portion 48 for the input of each of the sub-networks reduces computational time and memory, and reduces hardware.

A CPL portion 58 of the second sub-network 46 also directly receives the first stage of data from the FEL portion 48 in lieu of providing a separate feature extraction layer for the second sub-network 46. A CPL portion 60 of the second sub-network 46 receives the first stage of data from the CPL portion 50, and a CPL portion 62 of the second sub-network 46 having a 2× deconvolution member 64 receives the output from the CPL portion 52. An output from the deconvolution member 64 and the output from the CPL portion 62 are added and passed through a 2× deconvolution member 66. An output from the deconvolution member 66 and the output from the CPL portion 58 are added and passed through an 8× deconvolution member 68 to generate the segmentation data set 38.

The HCNN system 10 provides a method to combine different networks to perform multiple tasks efficiently in one combined heterogonous network, thus using a smaller memory footprint, saving memory resources. Due to the synergies in the FEL portion 48 the partially combined network performs the tasks faster than running separate networks. The HCNN system 10 is described in one present example for use in a perception kit for an ADAS and autonomous vehicle vision system. The HCNN system 10 performs two tasks simultaneously, which in the example of the ADAS and autonomous vehicle vision system includes lane detection and object detection. The first task in this example is the lane detection task, where a pixel level segmentation is the solution for the problem to determine lanes in the picture or image of the road and the output for this sub-task is a colored image that shows the drivable lanes in front of the host vehicle. The second task is object detection, classification, and localization for certain classes of objects (vehicles, pedestrians, traffic signs, traffic lights, etc.), where the output for this task is a list of detected objects with confidence level and location information.

Turning now to FIG. 3, a method 100 for training the HCNN system 10 is shown. The method 100 is configured to train any number of tasks 1, 2 . . . n where n is a whole number greater than 1. The tasks 1, 2 . . . n may, for example, correspond to the first sub-network 44, the second sub-network 46, up to the n sub-network 47, respectively. Thus, these tasks may include lane detection and object detection, as described above. In general, the method 100 trains each task sequentially using a first batch of images related to the first task, then a second batch of images related to the second task, etc., until the epoch is finished. Then, another epoch is trained after mixing the batches.

The method 100 begins at step 102 where batches sizes for each of the tasks 1, 2 . . . n are identified. Each batch is comprised of annotated images that correspond to the tasks 1, 2 . . . n. A batch size is defined as the number of images within the batch, as noted above. In one example, the batch size is selected from 8, 16, 32, or 64 images. However, it should be appreciated that other batch sizes may be employed.

The method 100 then proceeds to step 104 where batch images for each task are defined. For example, task 1 is assigned batches 1, 2 . . . x where x is a whole number greater than 1. For each of the batches 1, 2 . . . x, a set of annotated images are assigned. These annotated images correspond to the task 1. For example, where task 1 is lane detection, then the annotated images assigned to batches 1, 2 . . . x include annotated lanes that train the HCNN on lane detection. Each of the batches 1, 2 . . . x includes a set of annotated images up to the batch size. Likewise, task 2 is assigned batches 1, 2 . . . y where y is a whole number greater than 1. For each of the batches 1, 2 . . . y, a set of annotated images are assigned. These annotated images correspond to the task 2. For example, where task 2 is object detection, then the annotated images assigned to batches 1, 2 . . . y include annotated objects that train the HCNN on object detection. Each of the batches 1, 2 . . . y includes a set of annotated images up to the batch size. Defining batch images is repeated for n tasks and z batches, where z is a whole number greater than 1.

Next, at step 106, the HCNN is trained sequentially on batches for each of the tasks 1, 2 . . . n. Training the HCNN includes processing a batch of images and determining a loss function. The loss function is determined from comparing the output from a sub-network and comparing the output to the annotated image. The loss function is then used to adjust the weights used in the HCNN. Processing all of the batches completes an epoch. For example, at step 108 the HCNN is trained on the batch 1 images for task 1. Next, at step 110 the HCNN is trained on batch 1 images for task 2. At step 112 the HCNN is trained on batch 1 images for task n. At step 114 the HCNN is trained on batch 2 images for task 1. At step 116 the HCNN is trained on batch 2 images for task 2. At step 118 the HCNN is trained on batch 2 images for task n. The sequential training continues for each of the batches and each of the tasks until at step 120 the HCNN is trained on batch x images for task 1, at step 122 the HCNN is trained on batch y images for task 2, and at step 124 the HCNN is trained on batch z images for task n. At the completion of step 106 an entire epoch has been completed. At step 126 the images are shuffled such that each of the batches are comprised of a new set of images. The method then returns to step 104 to train another epoch. The method 100 may train as many epochs as required to reach an overall detection accuracy by the HCNN.

FIGS. 4a-4c illustrate individual stages of training batches using the method 100 for tasks 1, 2 . . . n. In the example provided, task 1 includes the first sub-network 44, task 2 includes the second sub-network 46, up to task n which includes the n sub-network 47. In each stage a loss function of a specific task of one sub-network is minimized to train the layers that belong to that task while freezing the other sub-network or sub-networks. For example, a loss function ($L_2$) for the road segmentation task of the second sub-network 46 is a binary cross entropy loss, and a loss function ($L_1$) for the object detection task of the first sub-network 44 is a sum of a localization loss (e.g., smooth $L_1$) and a confidence (e.g., a soft-max or multi-class cross entropy loss). When training batches 1, 2 ... x for task 1, as shown in FIG. 4a, an image 70 from the batches 1, 2 ... x for task 1 is processed by the FEL portion 48 and then processed by the first sub-network 44 to provide the network output 32. The loss function Li is determined from the network output 32. The second sub-network 46 up through the n sub-network 47 are frozen and do not process the image 70.

When training batches 1, 2 ... y for task 2, as shown in FIG. 4b, an image 72 from the batches 1, 2, ... y for task 2 is processed by the FEL portion 48 and then processed by the second sub-network 46 to provide the network output 38. The loss function $L_2$ is determined from the network output 38. The first sub-network 44 up through the n sub-network 47 are frozen and do not process the image 72.

When training batches 1, 2 ... z for task n, as shown in FIG. 4c, an image 74 from batches 1, 2 ... z for task n is processed by the FEL portion 48 and then processed by the n sub-network 47 to provide the network output n 49. A loss function $L_n$ is determined from the network output n 49. The first sub-network 44, the second sub-network 46, up through but not including the n sub-network 47 are frozen and do not process the image 74. Thus, training the layers of one task or sub-network does not affect the layers of the other tasks or sub-networks.

A heterogeneous convolutional neural network (HCNN) system 10 of the present disclosure offers several advantages. These include the capability to merge separate machine vision challenges in a single heterogeneous network, thereby reducing overall memory usage and the time needed to run predictions. For automobile vehicle vision systems, this permits object detection including classification and localization and road segmentation including lane detection to be addressed together using output from a single feature extraction layer (FEL) portion of the convolutional neural networks. In addition, each sub-network can be trained using a loss function of that sub-network while freezing the other sub-network or sub-networks. Training the HCNN system 10 using the method 100 increases accuracy by preventing weights from one task overriding weights from another task.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of training a heterogeneous convolutional neural network (HCNN) system, the method comprising:
   identifying batch sizes for at least a first task and a second task;
   defining images for at least a first batch and a second batch for the first task;
   defining images for at least a first batch and a second batch for the second task;
   training the HCNN using the first batch for the first task;
   training the HCNN using the first batch for the second task;
   training the HCNN using the second batch for the first task;
   training the HCNN using the second batch for the second task; and
   reshuffling the images for each batch,
   wherein images defined for the first batch include a first set of annotated images up to a predetermined first batch size, and wherein images defined for the second batch include a second set of annotated images up to a predetermined second batch size wherein each of the at least first task and second task are completed sequentially, and wherein the first set of annotated images are shuffled after completion of the first task, and wherein the second set of annotated images are reshuffled after completion of the second task, and wherein each subsequent set of annotated images are reshuffled after completion of subsequent tasks.

2. The method of claim 1 wherein training the HCNN using the first batch for the first task and using the first batch for the second task further comprises:
   processing the first batch of images; and
   determining a loss function for a sub-network of the HCNN while freezing other sub-networks of the HCNN, wherein the loss function is determined by:
   comparing an output from a sub-network of the HCNN to the annotated images of the first batch; and
   adjusting weights used in the HCNN.

3. The method of claim 1 wherein training the HCNN using the second batch for the first task and using the second batch for the second task further comprises:
   processing the second batch of images; and
   determining a loss function for a sub-network of the HCNN while freezing other sub-networks of the HCNN, wherein the loss function is determined by:
   comparing an output from a sub-network of the HCNN to the annotated images of the second batch; and
   adjusting weights used in the HCNN.

4. The method of claim 1 wherein the first task comprises object detection, classification, and localization, and wherein an output of the first task comprises a list of detected objects, and a detected object table.

5. The method of claim 1 wherein the second task comprises lane detection, and wherein an output of the second task includes a pixel level segmentation, wherein the pixel level segmentation defines a colored image defining a segmentation data set indicating drivable roads or lanes in front of a host vehicle.

6. The method of claim 1 wherein training the HCNN using the first batch for the first task does not affect the second batch or the second task, or subsequent batches or subsequent tasks.

7. The method of claim 1 wherein the at least first and second tasks are accomplished in a single HCNN, wherein each of the at least first and second tasks is accomplished independently from each of the other at least first and second tasks by preventing weights from one of the tasks from overriding weights from another of the tasks.

8. A system for training a heterogeneous convolutional neural network (HCNN) includes:
   a controller having a processor, a memory, and input/output ports, the controller receiving and transmitting data via the input/output ports, the processor executing control logic stored in the memory and utilizing the data as inputs and outputs for the control logic; and
   wherein when the control logic is executed by the processor, the control logic:
   identifies batch sizes for at least a first task and a second task;
   defines images for at least a first batch and a second batch for the first task;
   defines images for at least a first batch and a second batch for the second task;
   trains the HCNN using the first batch for the first task;
   trains the HCNN using the first batch for the second task;

trains the HCNN using the second batch for the first task;
trains the HCNN using the second batch for the second task; and
reshuffles the images for each batch,
wherein images defined for the first batch include a first set of annotated images up to a predetermined first batch size, and wherein images defined for the second batch include a second set of annotated images up to a predetermined second batch size, and wherein each of the at least first task and second task are completed sequentially, and wherein the first set of annotated images are shuffled after completion of the first task, and wherein the second set of annotated images are reshuffled after completion of the second task, and wherein each subsequent set of annotated images are reshuffled after completion of subsequent tasks.

9. The system of claim 8 wherein training the HCNN using the first batch for the first task and using the first batch for the second task further comprises:
processing the first batch of images; and
determining a loss function for a sub-network of the HCNN while freezing other sub-networks of the HCNN, wherein the loss function is determined by:
comparing an output from a sub-network of the HCNN to the annotated images of the first batch; and
adjusting weights used in the HCNN.

10. The system of claim 8 wherein training the HCNN using the second batch for the first task and using the second batch for the second task further comprises:
processing the second batch of images; and
determining a loss function for a sub-network of the HCNN while freezing other sub-networks of the HCNN, wherein the loss function is determined by:
comparing an output from a sub-network of the HCNN to the annotated images of the second batch; and
adjusting weights used in the HCNN.

11. The system of claim 8 wherein the first task comprises object detection, classification, and localization, and wherein an output of the first task comprises a list of detected objects, and a detected object table.

12. The system of claim 8 wherein the second task comprises lane detection, and wherein an output of the second task includes a pixel level segmentation, wherein the pixel level segmentation defines a colored image defining a segmentation data set indicating drivable roads or lanes in front of a host vehicle.

13. The system of claim 8 wherein training the HCNN using the first batch for the first task does not affect the second batch or the second task, or subsequent batches or subsequent tasks.

14. The system of claim 8 wherein the at least first and second tasks are accomplished in a single HCNN, wherein each of the at least first and second tasks is accomplished independently from each of the other at least first and second tasks by preventing weights from one of the tasks from overriding weights from another of the tasks.

15. A method of training a heterogeneous convolutional neural network (HCNN) system, the method comprising:
identifying batch sizes for at least a first task and a second task, wherein images defined for the first batch include a first set of annotated images up to a predetermined first batch size, and wherein images defined for the second batch include a second set of annotated images up to a predetermined second batch size;
defining images for at least a first batch and a second batch for the first task;
defining images for at least a first batch and a second batch for the second task;
training the HCNN using the first batch for the first task;
training the HCNN using the first batch for the second task;
training the HCNN using the second batch for the first task;
training the HCNN using the second batch for the second task, wherein each of the at least first task and second task are completed sequentially; and
reshuffling the images for each batch, and wherein the first set of annotated images are shuffled after completion of the first task, and wherein the second set of annotated images are reshuffled after completion of the second task, and wherein each subsequent set of annotated images are reshuffled after completion of subsequent tasks, and wherein the at least first and second tasks are accomplished in a single HCNN, wherein each of the at least first and second tasks is accomplished independently from each of the other at least first and second tasks by preventing weights from one of the tasks from overriding weights from another of the tasks.

16. The method of claim 15 wherein training the HCNN using each of the first batch and the second batch for each of the first task and the second task further comprises:
processing each of batch of images; and
determining a loss function for a sub-network of the HCNN while freezing other sub-networks of the HCNN, wherein the loss function is determined by:
comparing an output from a sub-network of the HCNN to the annotated images of each batch; and
adjusting weights used in the HCNN.

* * * * *